(12) United States Patent  
Sasaki et al.

(10) Patent No.: US 12,252,118 B2  
(45) Date of Patent: Mar. 18, 2025

(54) RECOGNITION DEVICE AND METHOD FOR VEHICLE

(71) Applicant: DENSO CORPORATION, Kariya (JP)

(72) Inventors: Kengo Sasaki, Kariya (JP); Akira Itoh, Kariya (JP)

(73) Assignee: DENSO CORPORATION, Kariya (JP)

( * ) Notice: Subject to any disclaimer, the term of this patent is extended or adjusted under 35 U.S.C. 154(b) by 378 days.

(21) Appl. No.: 17/660,926

(22) Filed: Apr. 27, 2022

(65) Prior Publication Data

US 2022/0254166 A1    Aug. 11, 2022

Related U.S. Application Data

(63) Continuation of application No. PCT/JP2020/039225, filed on Oct. 19, 2020.

(30) Foreign Application Priority Data

Oct. 29, 2019   (JP) ................................. 2019-196523

(51) Int. Cl.
    *B60W 30/095*    (2012.01)
    *B60W 40/04*    (2006.01)
    *B60W 60/00*    (2020.01)

(52) U.S. Cl.
    CPC ........ *B60W 30/0956* (2013.01); *B60W 40/04* (2013.01); *B60W 60/0011* (2020.02); *B60W 60/0015* (2020.02); *B60W 60/00272* (2020.02); *B60W 60/00274* (2020.02); *B60W 2420/403* (2013.01); *B60W 2554/20* (2020.02);

(Continued)

(58) Field of Classification Search
CPC ............. B60W 30/0956; B60W 40/04; B60W 60/0011; B60W 60/0015; B60W 60/00272; B60W 60/00274; B60W 2420/403; B60W 2554/20; B60W 2554/4026; B60W 2554/4029; B60W 2554/4041; B60W 2554/4044; B60W 2554/406; B60W 2554/80; B60W 30/08; B60W 60/001; G08G 1/165; G08G 1/166; G08G 1/09; G08G 1/096725; G08G 1/16; G08G 1/168; G06V 20/58
See application file for complete search history.

(56) References Cited

U.S. PATENT DOCUMENTS 9,201,421 B1    12/2015   Fairfield et al.
2015/0254986 A1*   9/2015   Fairfield ............... B60W 30/00
                                                  707/687

(Continued)

*Primary Examiner* — Jelani A Smith
*Assistant Examiner* — Alyssa Rorie
(74) *Attorney, Agent, or Firm* — Maschoff Brennan

(57) ABSTRACT

In a recognition device, a recognition unit recognizes an object present in a direction of travel of an own vehicle and an estimated movement region of the object, a determination unit determines whether a path of the own vehicle is blocked by the object by determining whether the estimated movement region of the object overlaps with the path of the vehicle, based on a recognition result obtained by the recognition unit, in response to the determination unit determining that the path is blocked, an acquisition unit acquires information indicating whether the object is a moving object or a stationary object from an operator, and a change unit changes the estimated movement region recognized by the recognition unit, based on the information acquired by the acquisition unit.

8 Claims, 11 Drawing Sheets

(52) U.S. Cl.
CPC ............... *B60W 2554/4026* (2020.02); *B60W 2554/4029* (2020.02); *B60W 2554/4041* (2020.02); *B60W 2554/4044* (2020.02); *B60W 2554/406* (2020.02); *B60W 2554/80* (2020.02)

(56) References Cited

U.S. PATENT DOCUMENTS

| | | | |
|---|---|---|---|
| 2015/0307093 A1* | 10/2015 | Sasabuchi | B60W 10/18 |
| | | | 701/1 |
| 2017/0057497 A1 | 3/2017 | Laur et al. | |
| 2017/0101056 A1* | 4/2017 | Park | G08G 1/162 |
| 2017/0192426 A1 | 7/2017 | Rust | |
| 2019/0011912 A1 | 1/2019 | Lockwood et al. | |
| 2021/0089795 A1* | 3/2021 | Tamaki | G06V 20/58 |
| 2021/0114589 A1* | 4/2021 | Komuro | B60W 10/18 |
| 2022/0012561 A1* | 1/2022 | Yamaguchi | G06V 20/56 |
| 2022/0169245 A1* | 6/2022 | Hieida | G08G 1/162 |
| 2022/0182498 A1* | 6/2022 | Singh | G08G 1/16 |

\* cited by examiner

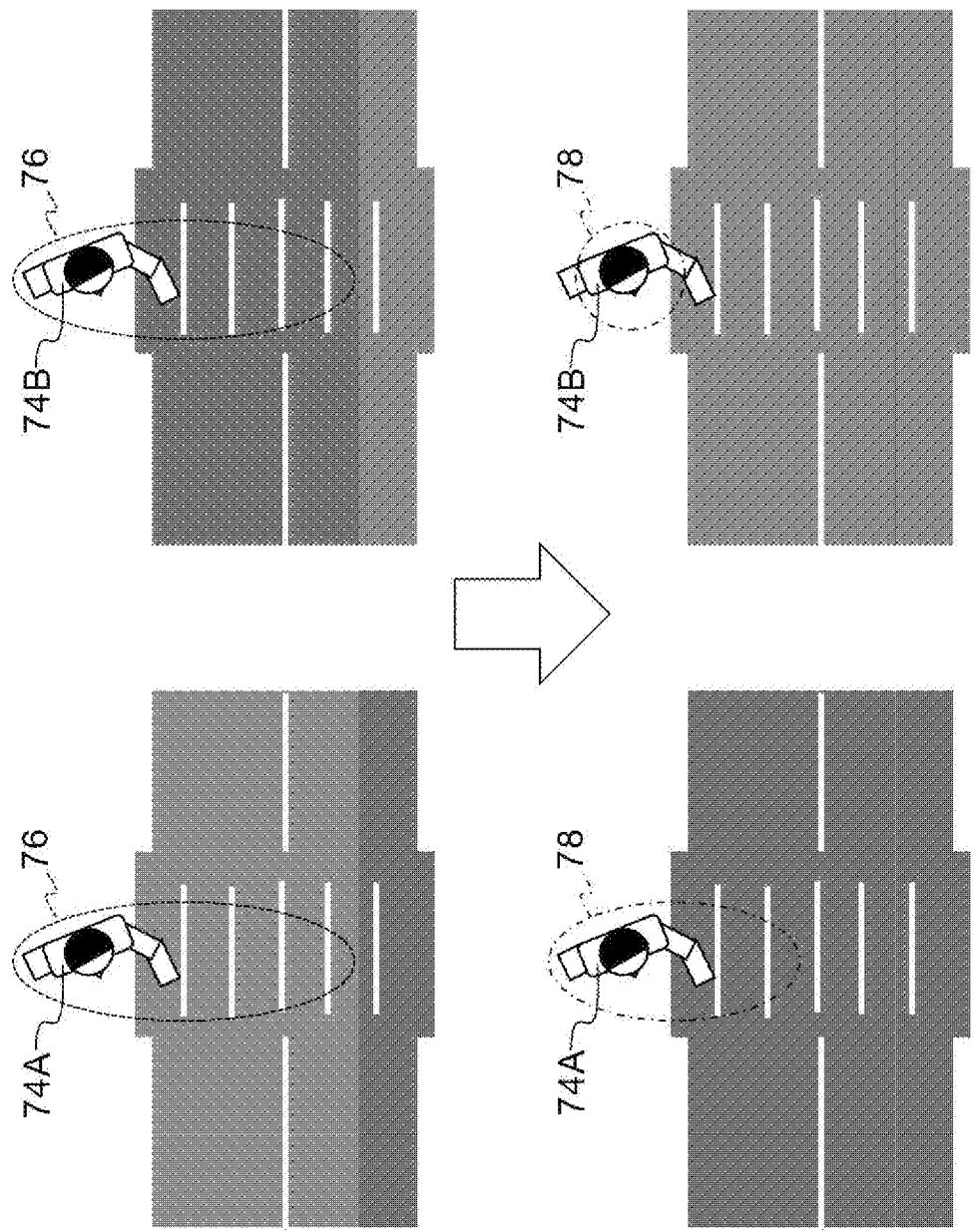

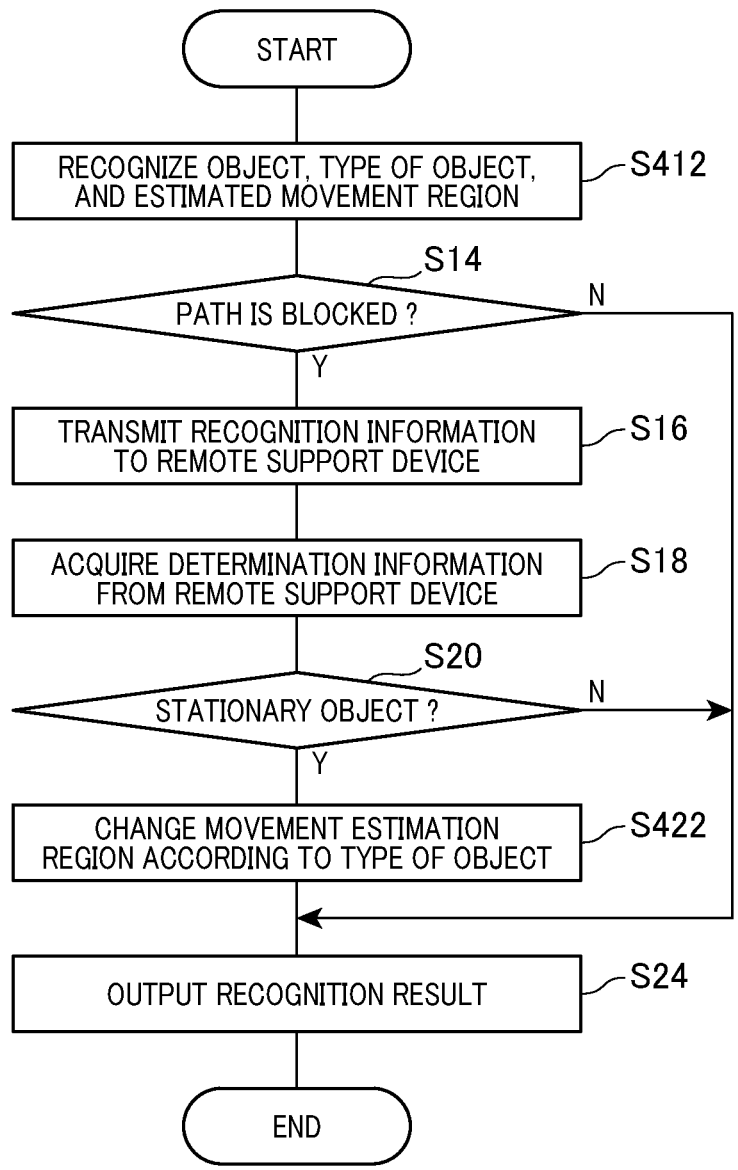

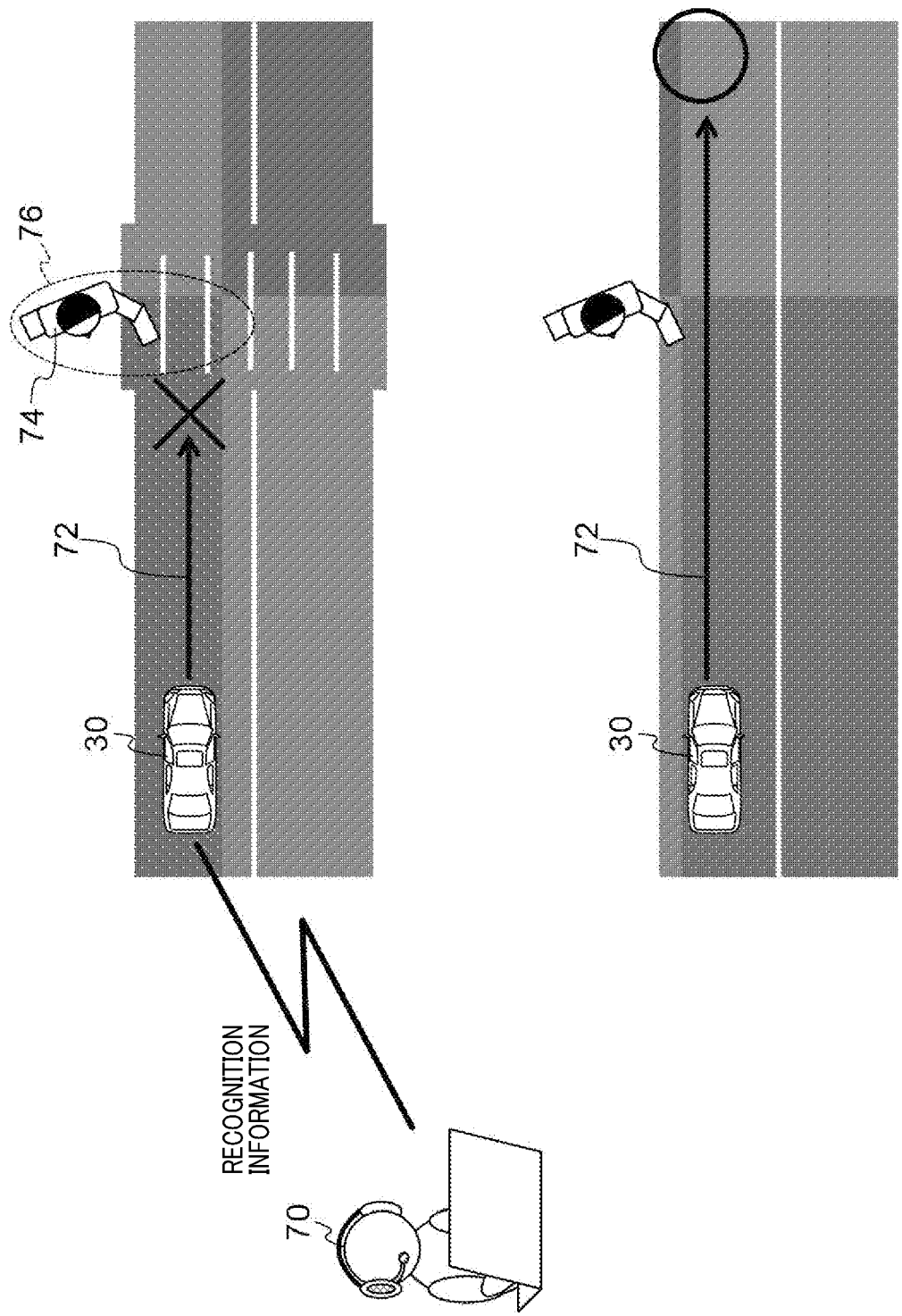

RECOGNITION DEVICE AND METHOD FOR VEHICLE

CROSS-REFERENCE TO RELATED APPLICATION

This application is a continuation application of International Application No. PCT/JP2020/039225 filed Oct. 19, 2020 which designated the U.S. and claims priority to Japanese Patent Application No. 2019-196523 filed with the Japan Patent Office on Oct. 29, 2019, the entire contents of each of which are incorporated herein by reference.

BACKGROUND

Technical Field

The present disclosure relates to a recognition device and a recognition method for a vehicle.

Related Art

Systems for controlling an autonomous vehicle have conventionally been proposed. For example, as a method for controlling an autonomous vehicle, a method is proposed in which manual instructions are obtained from a remote user to relax a constraint of a roadway on which an autonomous vehicle is travelling that would interfere with movement of the autonomous vehicle. In this method, the manual instructions are implemented via a processor onboard the autonomous vehicle to facilitate movement of the autonomous vehicle using the relaxed constraint.

BRIEF DESCRIPTION OF THE DRAWINGS

In the accompanying drawings:

FIG. 11 is a diagram illustrating a change in the estimated movement region according to a type of a pedestrian;

FIG. 12 is a flow chart showing an example of a recognition process of the fourth embodiment; and FIG. 13 is a diagram illustrating the case where a pedestrian located at a crosswalk is recognized.

DESCRIPTION OF SPECIFIC EMBODIMENTS

Figure 1:
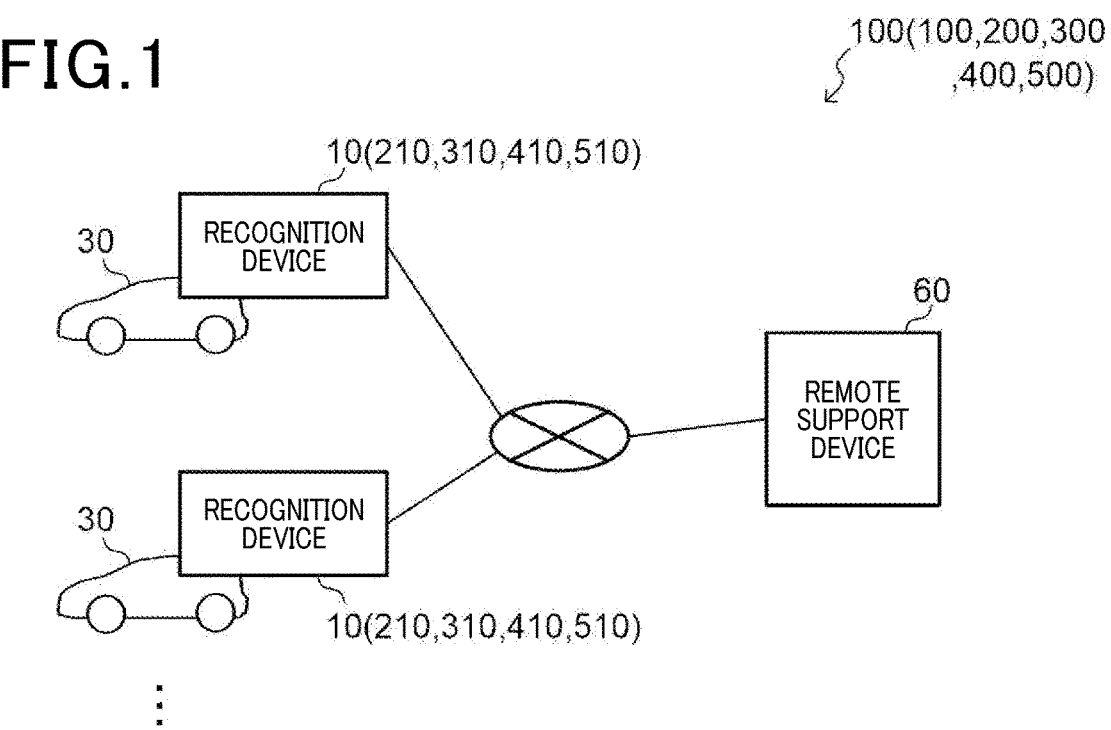
FIG. 1 is a block diagram illustrating a schematic configuration of an autonomous driving system according to first to fifth embodiments.

For example, when a pedestrian standing in front of a crosswalk with no traffic signal is recognized while a vehicle is autonomously traveling, it is difficult for a computer to determine whether the pedestrian crosses the crosswalk. As a result of the detailed studies, the inventors have found an issue in that an autonomous vehicle estimates a sufficiently large region for movement of a pedestrian in order to prevent an accident with the pedestrian, and this may cause blockage of the path of the autonomous vehicle, interfering with movement of the autonomous vehicle.

The inventors also have found an issue in that the system for controlling an autonomous vehicle, as described in US 2017/192426 A applied in such a case may frequently cause processes such as relaxation of a constraint by a remote user and recalculation of a travel path according to the relaxed constraint, and unnecessary avoidance travel.

In view of the foregoing, it is desired to have a technique for performing a recognition process for recognizing an object to facilitate travel of an autonomous vehicle.

A first aspect of the present disclosure provides a recognition device including a recognition unit that recognizes an object present in a direction of travel of an own vehicle and an estimated movement region of the object, a determination unit that determines whether a path of the own vehicle is blocked by the object by determining whether the estimated movement region of the object overlaps with the path of the own vehicle, based on a recognition result obtained by the recognition unit, an acquisition unit that in response to the determination unit determining that the path is blocked, acquires information indicating whether the object is a moving object or a stationary object from an operator, and a change unit that changes the estimated movement region recognized by the recognition unit, based on the information acquired by the acquisition unit.

A second aspect of the present disclosure provides a recognition method including recognizing, by a recognition unit, an object present in a direction of travel of an own vehicle and an estimated movement region of the object, determining, by a determination unit, whether a path of the own vehicle is blocked by the object by determining whether the estimated movement region of the object overlaps with the path of the own vehicle, based on a recognition result obtained by the recognition unit, in response to the determination unit determining that the path is blocked, acquiring, by an acquisition unit, information indicating whether the object is a moving object or a stationary object from an operator, and changing, by a change unit, the estimated movement region recognized by the recognition unit, based on the information acquired by the acquisition unit.

A third aspect of the present disclosure provides a non-transitory computer readable storage medium having instructions stored thereon that, when executed by a computer, cause the computer to function as a recognition unit that recognizes an object present in a direction of travel of an own vehicle and an estimated movement region of the object, a determination unit that determines whether a path of the own vehicle is blocked by the object by determining whether the estimated movement region of the object overlaps with the path of the own vehicle, based on a recognition result obtained by the recognition unit, an acquisition unit that in response to the determination unit determining that the path is blocked, acquires information indicating whether the object is a moving object or a stationary object from an operator, and a change unit that changes the estimated movement region recognized by the recognition unit, based on the information acquired by the acquisition unit.

In the recognition device, method, and non-transitory computer readable storage medium according to the present disclosure, in the case where the path of the own vehicle is blocked by an object, information indicating whether the object is a moving object or a stationary object is acquired from the operator, and an estimated movement region of the object is changed based on the acquired information. This makes it possible to perform a recognition process for recognizing an object to facilitate travel of an autonomous vehicle.

Embodiments will be described below.

First Embodiment

As shown in FIG. 1, an autonomous driving system 100 according to a first embodiment includes a recognition device 10 mounted on a vehicle 30, and a remote support device 60 provided in a control center or in the cloud. The number of vehicles 30 equipped with the recognition device 10 and the number of remote support devices 60 that are included in the autonomous driving system 100 are not limited to those shown in the example in FIG. 1.

In the autonomous driving system 100, a control device (not shown) for controlling autonomous driving is mounted on the vehicle 30 that is used, for example, as a private car, a bus, a taxi, a ride-sharing vehicle, or the like. The control device determines a route to the specified destination, and controls components of the vehicle 30 so that the vehicle 30 travels along the determined route, thereby achieving autonomous driving. Furthermore, the control device uses information on an object recognized by the recognition device 10 to control the autonomous driving of the vehicle 30.

Figure 2:
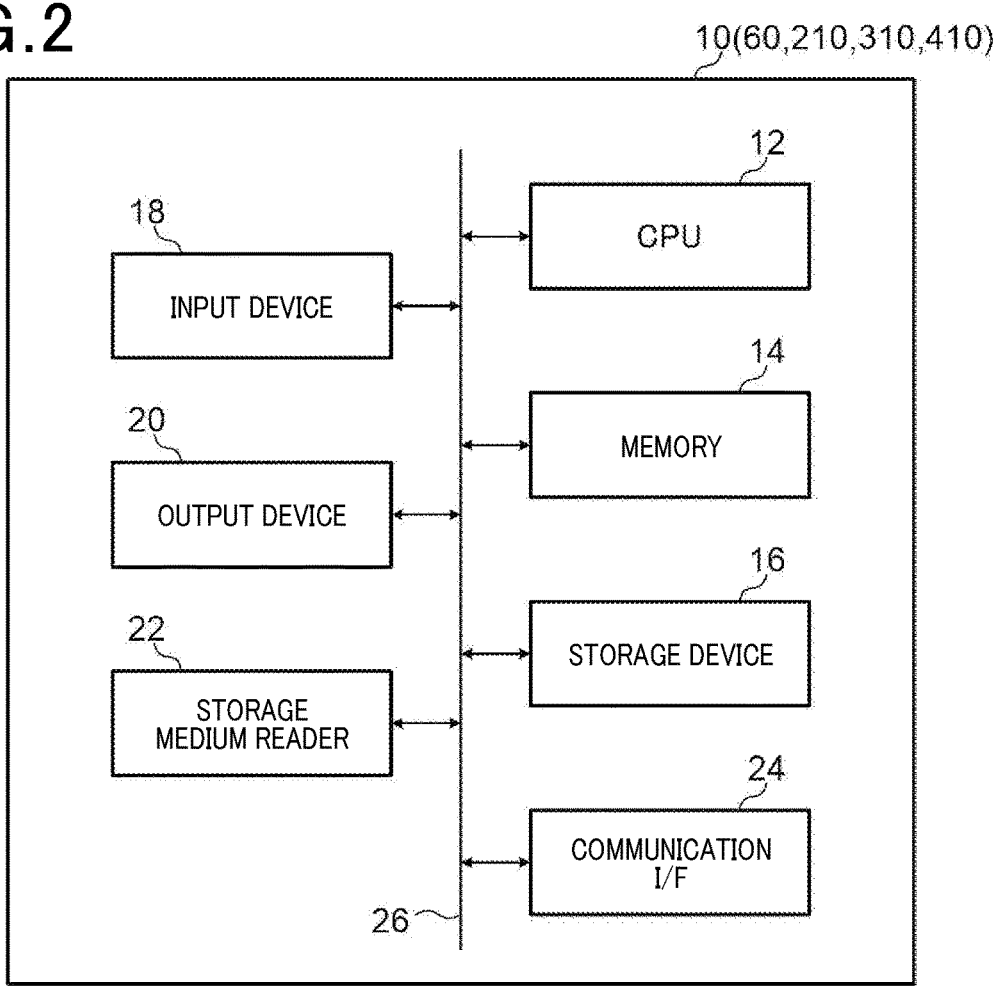
FIG. 2 is a block diagram illustrating a hardware configuration of a recognition device according to the first to fifth embodiments.

FIG. 2 shows a hardware configuration of the recognition device 10 according to the first embodiment. As shown in FIG. 2, the recognition device 10 includes a central processing unit (CPU) 12, a memory 14, a storage device 16, an input device 18, an output device 20, a storage medium reader 22, and a communication interface (I/F) 24. The components are connected so as to be able to communicate with each other via a bus 26.

The storage device 16 stores a recognition program for performing a recognition process (described later). The CPU 12 is a central arithmetic processing unit, and executes various programs and controls the components. Specifically, the CPU 12 reads a program from the storage device 16, and executes the program using the memory 14 as a work area. The CPU 12 controls the components and performs various types of arithmetic processing according to the programs stored in the storage device 16.

The memory 14 may be composed of a random access memory (RAM), and temporarily stores, as a work area, a program and data. The storage device 16 may be composed of a read only memory (ROM), a hard disk drive (HDD), a solid state drive (SSD), and the like, and stores various programs including an operating system, and various data.

The input device 18 is a device for performing various inputs, and is, for example, a keyboard, a mouse, or the like. The output device 20 is a device for outputting various types of information, and is, for example, a display, a printer, or the like. The output device 20 may be a touch panel display that also functions as the input device 18.

The storage medium reader 22 reads data stored in various storage media such as a compact disc ROM (CD-ROM), a digital versatile disc ROM (DVD-ROM), a Blu-ray Disc, and a universal serial bus (USB) memory, and writes data into storage media.

The communication I/F 24 is an interface for communicating with other devices, and for example, Ethernet (registered trademark), FDDI, Wi-Fi (registered trademark), or the like is used as a standard.

The remote support device 60 is implemented by an information processing device such as a personal computer or a server device. A hardware configuration of the remote support device 60 is approximately the same as the hardware configuration of the recognition device 10 shown in FIG. 2 and thus will not be described.

Figure 3:
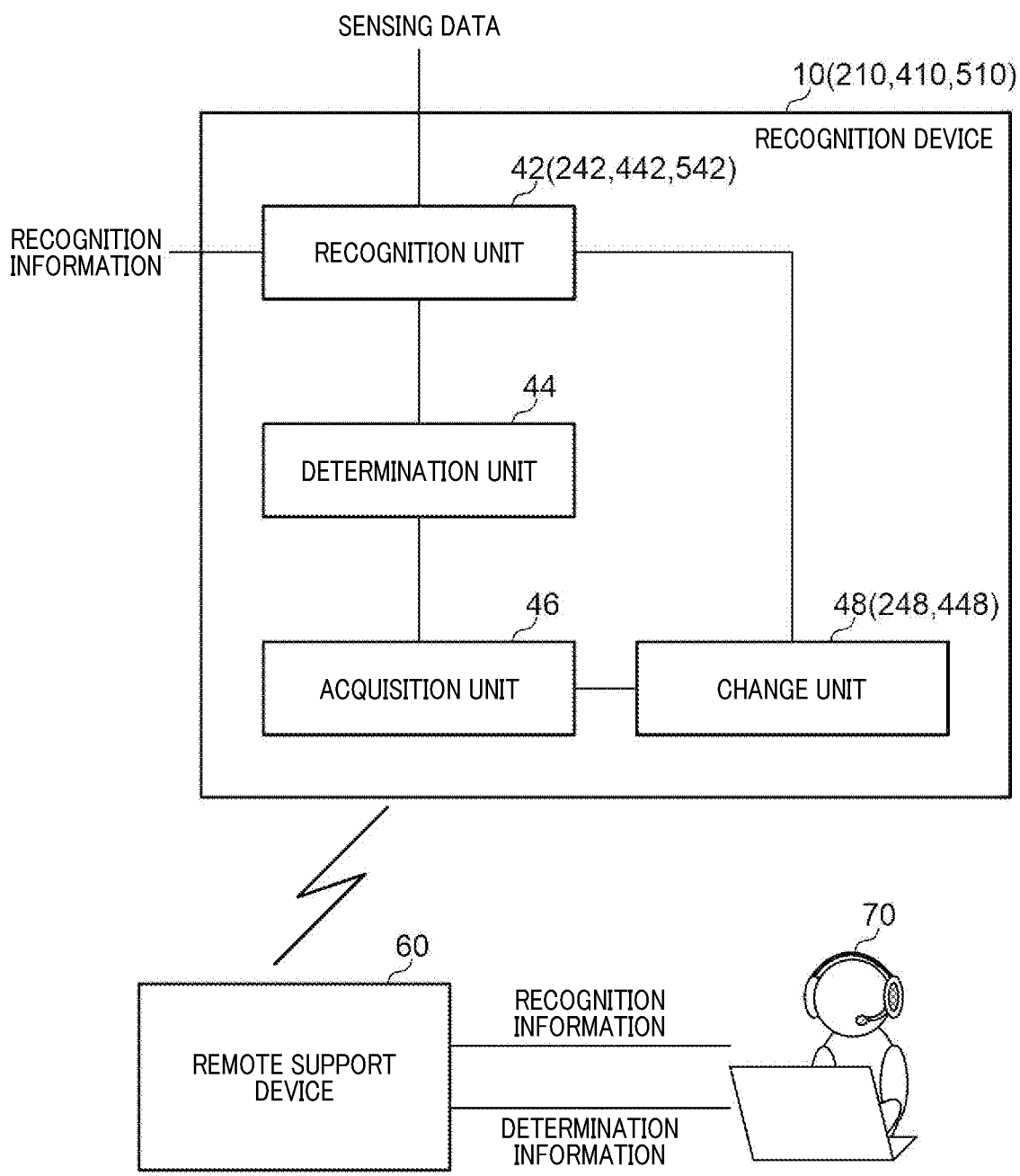
FIG. 3 is a block diagram illustrating a functional configuration of the recognition device according to the first, second, fourth, and fifth embodiments.

Next, a functional configuration of the recognition device 10 according to the first embodiment will be described with reference to FIG. 3. As shown in FIG. 3, the recognition device 10 includes a recognition unit 42, a determination unit 44, an acquisition unit 46, and a change unit 48. The functional units are implemented by the CPU 12 shown in FIG. 2.

The recognition unit 42 recognizes an object present in the direction of travel of the vehicle 30, and an estimated movement region of the object. Specifically, the recognition unit 42 acquires sensing data obtained by sensing an area around the vehicle 30. The sensing data is, for example, an image captured by a camera, three-dimensional point group data measured by a laser radar, or the like. The recognition unit 42 analyzes the acquired sensing data, and recognizes an object that can be an obstacle. For example, the recognition unit 42 recognizes a pedestrian as the object.

Based on a type, a size, a position, a moving speed, a direction of movement, and the like of the recognized object, the recognition unit 42 estimates a region in which the object can move by the next recognition timing, and recognizes the region as an estimated movement region. A specific method of recognizing an object and an estimated movement region may be a conventionally known method and thus will not be described in detail.

The recognition unit 42 transfers recognition information including the information on the object and the estimated movement region to the determination unit 44. The recognition information may be, for example, an image obtained by superimposing a frame or the like indicating the recognized object and estimated movement region on an image acquired as the sensing data. Alternatively, the recognition information may be, for example, data obtained by adding three-dimensional position information on the object and the estimated movement region to three-dimensional point group data acquired as the sensing data.

For example, when a pedestrian who is present in the vicinity of a crosswalk is recognized as the object, it is difficult for a computer to determine whether the pedestrian will cross the crosswalk. Thus, in consideration of safety, the recognition unit 42 recognizes an estimated movement region of the object assuming that the pedestrian will cross the crosswalk. As a result, a large region tends to be recognized as the estimated movement region.

Figure 4:
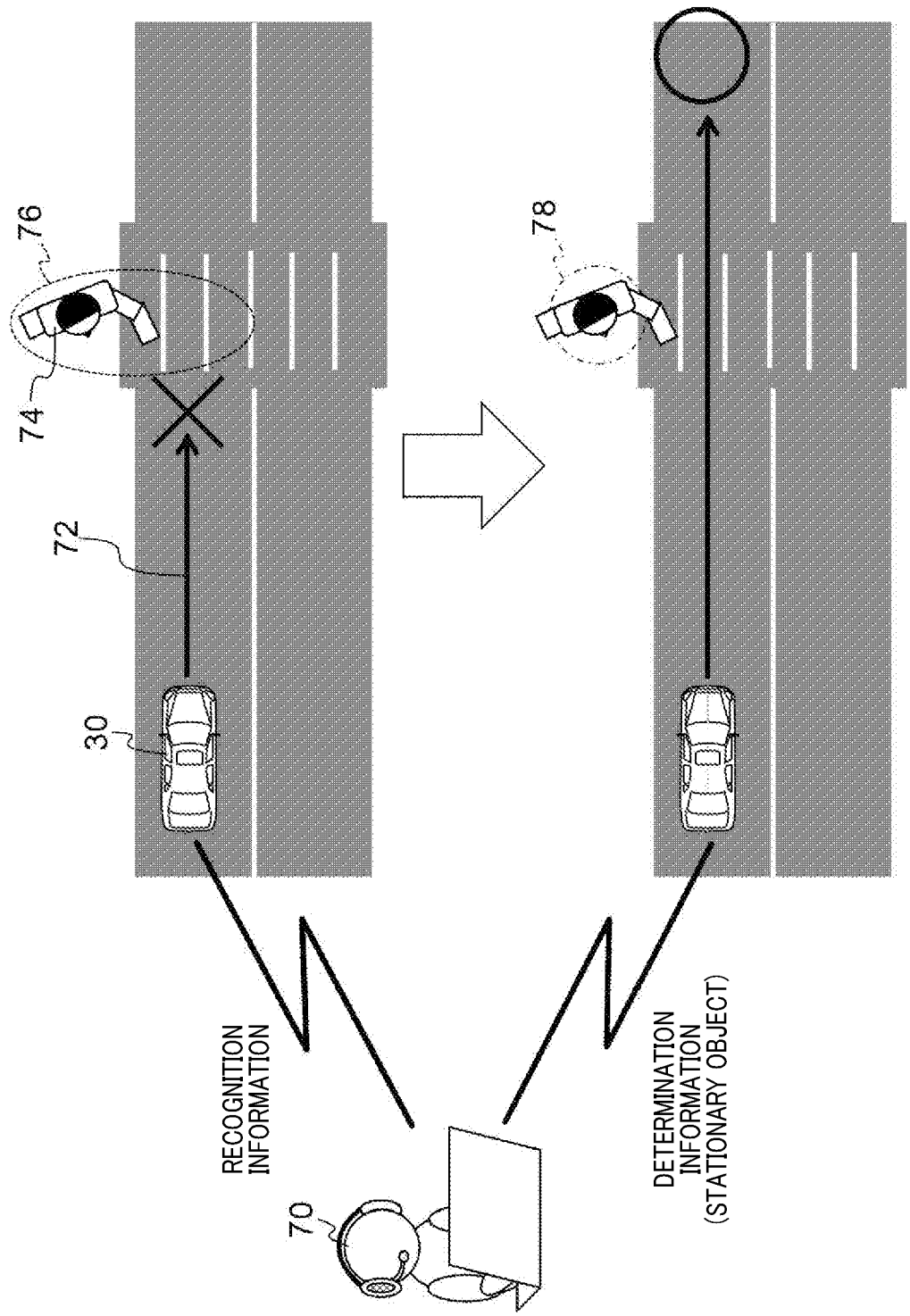
FIG. 4 is a diagram illustrating blockage of a path.

The determination unit 44 determines whether a path of the vehicle 30 is blocked by the object, based on the recognition information transferred from the recognition unit 42. Specifically, the determination unit 44 determines that the path is blocked, in the case where, as shown in FIG. 4, an estimated movement region 76 of an object 74 recognized by the recognition unit 42 overlaps with a path 72 of the vehicle 30 traveling along the route determined by the control device. In the case where the path 72 is determined to be blocked, the determination unit 44 transfers the recognition information to the acquisition unit 46, and instructs the acquisition unit 46 to acquire determination information (described later in detail). In the case where the path 72 is determined not to be blocked, the determination unit 44 instructs the recognition unit 42 to output recognition information.

In the case where the acquisition unit 46 is instructed by the determination unit 44 to acquire determination information, the acquisition unit 46 transmits, to the remote support device 60, the recognition information transferred from the determination unit 44 to contact an operator 70 and request the operator 70 to determine whether the recognized object 74 is a moving object or a stationary object.

In the remote support device 60 that has received the recognition information, a display device displays, for example, the recognition information such as an image or a three-dimensional point group data to which the recognition result of recognizing the object 74 and the estimated movement region 76 is added. Then, the operator 70 checks the displayed recognition information, determines whether the object 74 is a moving object or a stationary object, and inputs the determination result to the remote support device 60. Thus, the determination information indicating whether the object 74 is a moving object or a stationary object is transmitted from the remote support device 60 to the recognition device 10.

The acquisition unit 46 acquires the determination information transmitted from the remote support device 60, and transfers the determination information to the change unit 48.

The change unit 48 changes the estimated movement region 76 recognized by the recognition unit 42, based on the determination information transferred from the acquisition unit 46. Specifically, in the case where the determination information indicates that the object 74 is a stationary object, the change unit 48 changes the estimated movement region 76 recognized by the recognition unit 42 so that the estimated movement region 76 is reduced. More specifically, in the case where the object 74 is a pedestrian and the pedestrian is stationary, the object 74 is less likely to run out into the path; thus, the change unit 48 changes the estimated movement region 76 so that the radius of the estimated movement region 76 is reduced.

For example, as shown in FIG. 4, in the case where the object (pedestrian) 74 is determined to be a stationary object, the estimated movement region 76 before the change is reduced to an estimated movement region 78. Thus, the blockage of the path is more likely to be eliminated, facilitating travel of an autonomous vehicle.

Next, an operation of the autonomous driving system 100 according to the first embodiment will be described.

Figure 5:
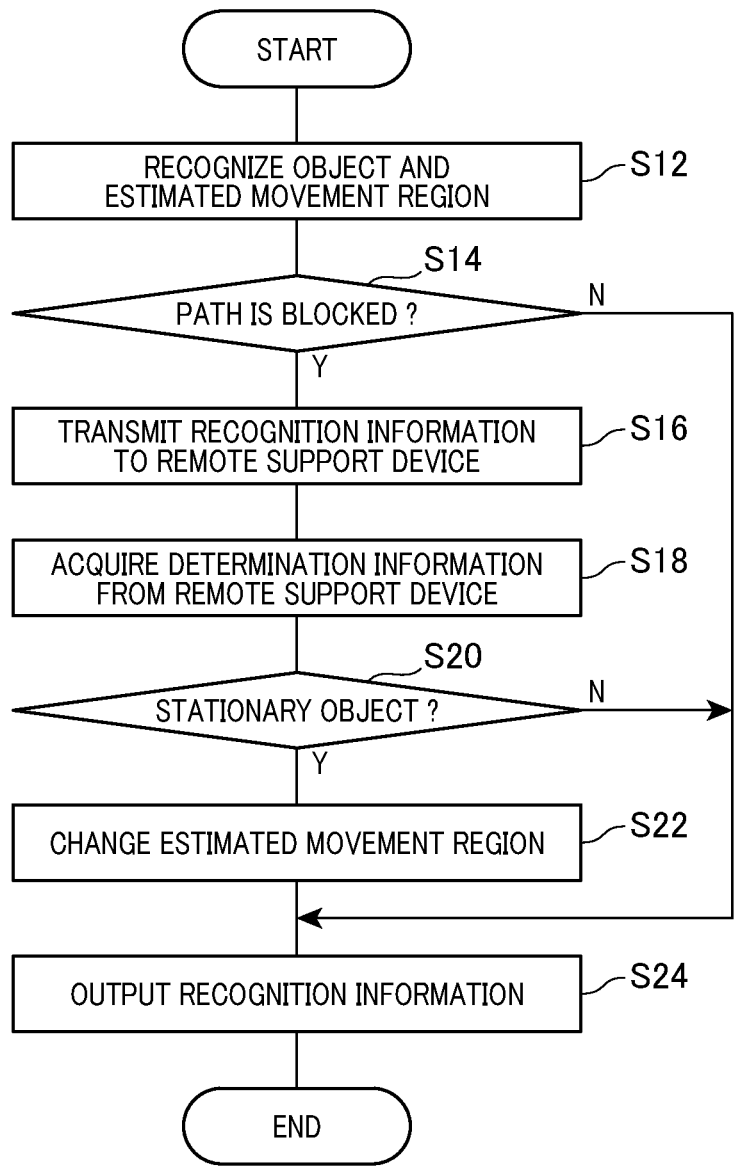
FIG. 5 is a flow chart showing an example of a recognition process of the first embodiment.

In the case where a route is determined by the control device mounted on the vehicle 30 and autonomous driving is started, the recognition device 10 performs a recognition process shown in FIG. 5. The recognition process is an example of the recognition method of the present disclosure.

In step S12, the recognition unit 42 acquires sensing data obtained by sensing an area around the vehicle 30. Then, the recognition unit 42 analyzes the acquired sensing data, and recognizes the object (e.g., a pedestrian) 74 that can be an obstacle, and the estimated movement region 76 of the object 74. Then, the recognition unit 42 transfers recognition information including the information on the object 74 and the estimated movement region 76 to the determination unit 44.

Next, in step S14, the determination unit 44 determines whether the path of the vehicle 30 is blocked by the object 74, based on the recognition information transferred from the recognition unit 42. In the case where the path of the vehicle 30 is blocked, the process proceeds to step S16, and in the case where the path of the vehicle 30 is not blocked, the process proceeds to step S24.

In step S16, the determination unit 44 transfers the recognition information to the acquisition unit 46, and instructs the acquisition unit 46 to acquire determination information. Then, the acquisition unit 46 transmits, to the remote support device 60, the recognition information transferred from the determination unit 44. Thus, the operator 70 is contacted.

Next, in step S18, the acquisition unit 46 acquires determination information based on the determination by the operator 70 and indicating whether the recognized object 74 is a moving object or a stationary object, and transfers the determination information to the change unit 48.

Next, in step S20, the change unit 48 determines whether the determination information indicates that the object 74 is a stationary object. In the case where the determination information indicates that the object 74 is a stationary object, the process proceeds to step S22, and in the case where the determination information indicates that the object 74 is a moving object, the process proceeds to step S24.

In step S22, the change unit 48 changes the estimated movement region 76 recognized in step S12 so that the estimated movement region 76 is reduced. For example, in the case where the object 74 is a pedestrian, the change unit 48 changes the estimated movement region 76 so that the radius of the estimated movement region 76 is reduced.

Next, in step S24, the recognition unit 42 outputs, to the control device, recognition information including the information on the recognized object 74, and the information on the estimated movement region 78 after the change in the case where the estimated movement region 76 has been changed in step S22 or on the estimated movement region 76 recognized in step S12 in the case where the estimated movement region 76 has not been changed in step S22. Then, the recognition process is ended.

As described above, in the autonomous driving system according to the first embodiment, in the case where the path is blocked by the recognized object and estimated movement region, the recognition device transmits the recognition information to the remote support device to contact the operator, and acquires determination information indicating whether the object is a moving object or a stationary object. In the case where the object is a stationary object, the recognized estimated movement region is changed to be reduced. Thus, the blockage of the path is more likely to be eliminated, facilitating travel of an autonomous vehicle.

Second Embodiment

Next, a second embodiment will be described. In an autonomous driving system according to the second embodiment, the same components as in the autonomous driving system 100 according to the first embodiment are denoted by the same reference numerals and will not be described in detail.

As shown in FIG. 1, an autonomous driving system 200 according to the second embodiment includes a recognition device 210 mounted on the vehicle 30, and the remote support device 60. A hardware configuration of the recognition device 210 is the same as the hardware configuration of the recognition device 10 according to the first embodiment shown in FIG. 2 and thus will not be described.

Next, a functional configuration of the recognition device 210 according to the second embodiment will be described with reference to FIG. 3. As shown in FIG. 3, the recognition device 210 includes a recognition unit 242, the determination unit 44, the acquisition unit 46, and a change unit 248. The functional units are implemented by the CPU 12 shown in FIG. 2.

The recognition unit 242 recognizes the object 74 present in the direction of travel of the vehicle 30, and the estimated movement region 76 of the object 74, as with the recognition unit 42 of the first embodiment. In the second embodiment, the recognition unit 242 recognizes, as the object 74, a two-wheeled vehicle such as a bicycle or a motorcycle.

In the case where the determination information transferred from the acquisition unit 46 to the change unit 248 indicates that a two-wheeled vehicle as the object 74 is a stationary object, the change unit 248 changes the estimated movement region 76 so that the width of the estimated movement region 76 in a straight-forward direction of the object 74 is reduced and the width of the estimated movement region 76 in a direction perpendicular to the straight-forward direction is increased.

Figure 6:
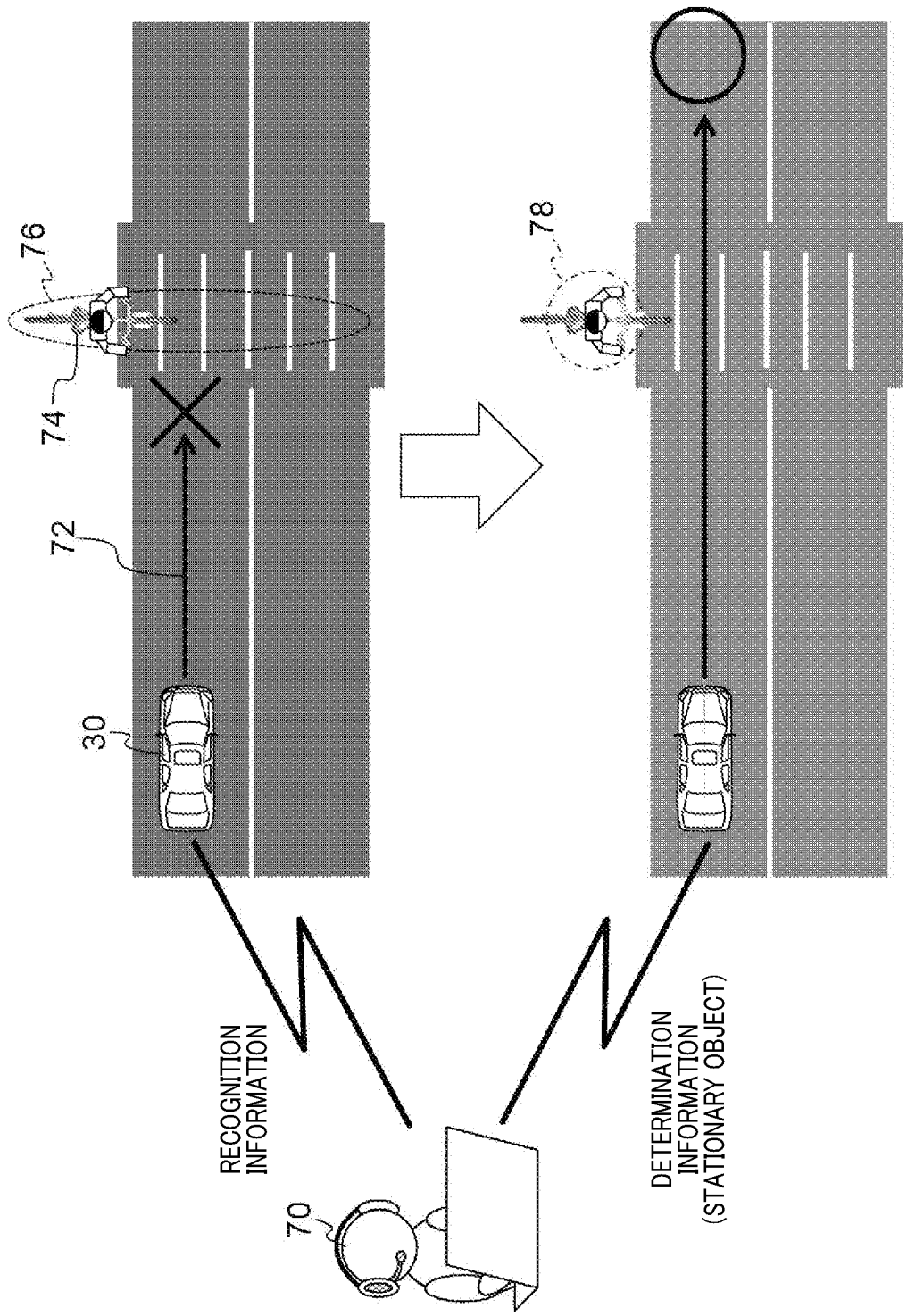
FIG. 6 is a diagram illustrating a change in an estimated movement region in the case where an object is a two-wheeled vehicle.

For example, assume that, as shown in FIG. 6, the object (two-wheeled vehicle) 74 facing a direction perpendicular to the path 72 of the vehicle 30 is recognized. In this case, the recognized estimated movement region 76 has a large width in a straight-forward direction of the two-wheeled vehicle. In the case where the two-wheeled vehicle is determined to be a stationary object, the two-wheeled vehicle that is stationary is more likely to change its direction to a direction parallel to the path 72 of the vehicle 30; thus, the estimated movement region 76 before the change is reduced to the estimated movement region 78.

An operation of the autonomous driving system 200 according to the second embodiment is the same as the operation of the autonomous driving system 100 according to the first embodiment, except that the object 74 is a two-wheeled vehicle and that the estimated movement region 76 is changed as described above, and thus will not be described.

As described above, in the autonomous driving system according to the second embodiment, in the case where the recognition device recognizes a two-wheeled vehicle as the object, the recognition device reduces the estimated movement region in consideration of the movement of the two-wheeled vehicle that is stationary, achieving the same effects as the first embodiment.

Third Embodiment

Next, a third embodiment will be described. In an autonomous driving system according to the third embodiment, the same components as in the autonomous driving system 100 according to the first embodiment are denoted by the same reference numerals and will not be described in detail.

As shown in FIG. 1, an autonomous driving system 300 according to the third embodiment includes a recognition device 310 mounted on the vehicle 30, and the remote support device 60. A hardware configuration of the recognition device 310 is the same as the hardware configuration of the recognition device 10 according to the first embodiment shown in FIG. 2 and thus will not be described.

Figures 7, 8:
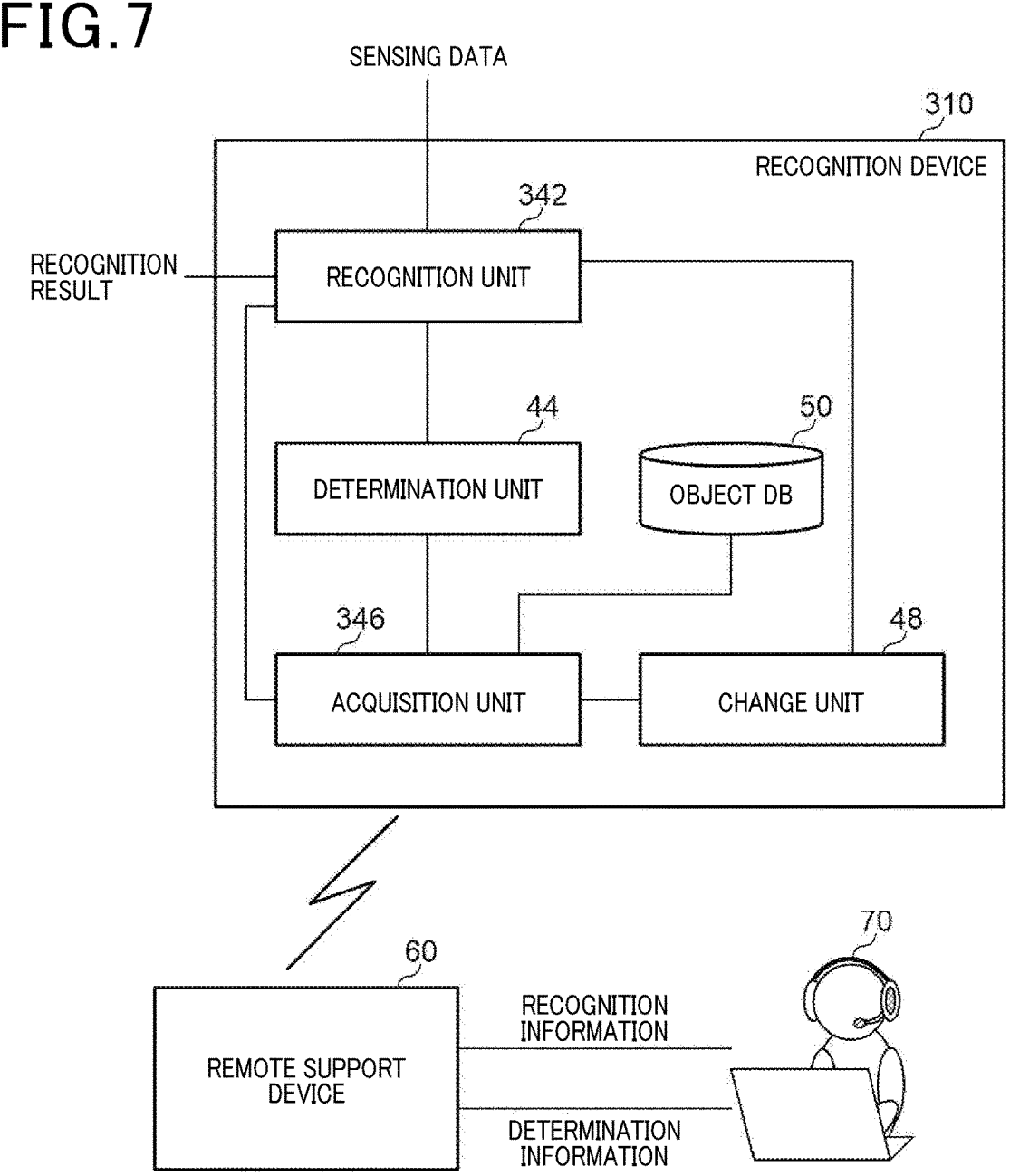
FIG. 7 is a block diagram illustrating a functional configuration of the recognition device according to the third embodiment.
FIG. 8 is a diagram showing an example of an object DB.

Next, a functional configuration of the recognition device 310 according to the third embodiment will be described with reference to FIG. 7. As shown in FIG. 7, the recognition device 310 includes a recognition unit 342, the determination unit 44, an acquisition unit 346, and the change unit 48. In a predetermined storage area of the recognition device 310, an object database (DB) 50 is stored. The functional units are implemented by the CPU 12 shown in FIG. 2.

The recognition unit 342 recognizes the object 74 present in the direction of travel of the vehicle 30, and the estimated movement region 76 of the object 74, as with the recognition unit 42 of the first embodiment. In the third embodiment, each time the recognition unit 342 recognizes a new object 74, the recognition unit 342 provides the object 74 with an object ID that is identification information. In the case where the recognition unit 342 tracks an object in the time-series sensing data and recognizes the same object 74, the recognition unit 342 provides the same object ID to the object 74. The recognition unit 342 includes the object ID of the recognized object 74 into the recognition information to be transferred to the determination unit 44.

The recognition unit 342 uses a scene recognition technique to recognize a scene indicating a situation around the vehicle 30, based on the sensing data. The recognition unit 342 recognizes, for example, a scene in which the vehicle 30 is in a traffic jam, the vehicle 30 is passing through an intersection with a traffic signal, a pedestrian is crossing a crosswalk, or the like. The recognition unit 342 transfers the recognition result of recognizing the scene to the acquisition unit 346.

The acquisition unit 346 determines whether to acquire determination information from the remote support device 60, according to the recognition result of recognizing the scene transferred from the recognition unit 342. Specifically, in the case where the same object 74 as the object 74 on which the determination information has been previously acquired from the remote support device 60 is recognized again by the recognition unit 42, and the scene recognized by the recognition unit 342 indicates a traffic jam, the acquisition unit 346 does not acquire determination information on the same object 74 recognized again.

More specifically, each time recognition information is transferred from the determination unit 44 to the acquisition unit 346, the acquisition unit 346 determines whether an object ID included in the recognition information is already present in the object DB 50. The object DB 50 stores, for example, as shown in FIG. 8, "previous determination information" that indicates the determination information acquired for each object 74 at the previous time and is associated with the object ID of the object 74.

In the case where the object ID of the object is not present in the object DB 50, the acquisition unit 346 acquires determination information on the object, as with the acquisition unit 46 of the first embodiment. Then, the acquisition unit 346 stores the acquired determination information as the "previous determination information" in association with the object ID.

Figure 9:
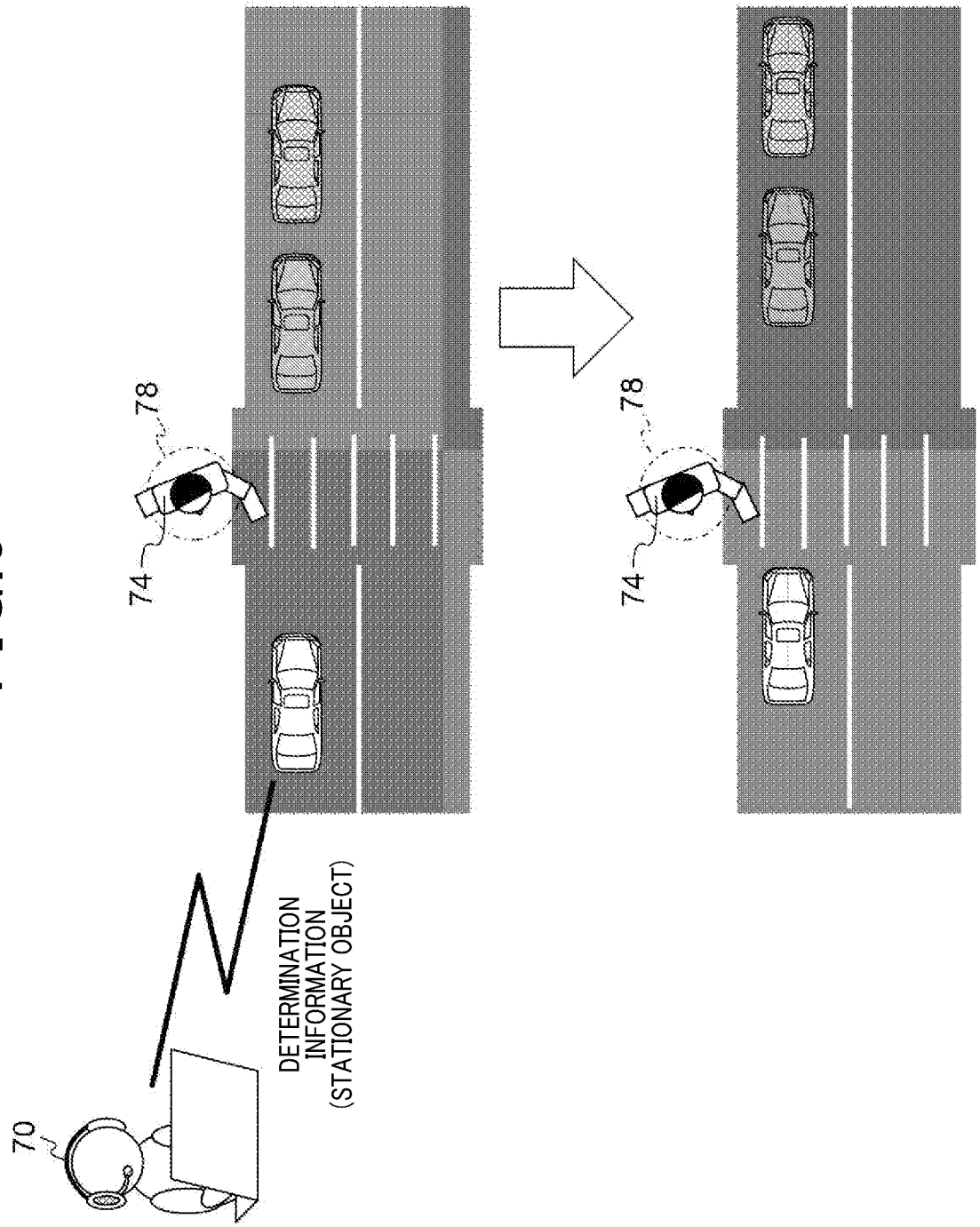
FIG. 9 is a diagram illustrating the case where the same object is recognized in the same scene.

In some cases, for example, as shown in FIG. 9, the same object 74 is recognized in the same scene in a situation such as a traffic jam. In this case, even though the estimated movement region has been reduced to the estimated movement region 78 based on the previous determination information, the estimated movement region 76 having a large area is recognized again for the object 74 recognized again in the same scene, causing blockage of the path and repeated contact with the operator 70.

Thus, in the case where the same object is recognized in the scene of a traffic jam, the acquisition unit 346 does not acquire determination information from the remote support device 60, and acquires the determination information stored in the object DB 50. In the case where the scene is not a traffic jam, the acquisition unit 346 acquires determination information from the remote support device 60, and updates the previous determination position and the previous determination information that are associated with the object ID of the object in the object DB 50.

Figure 10:
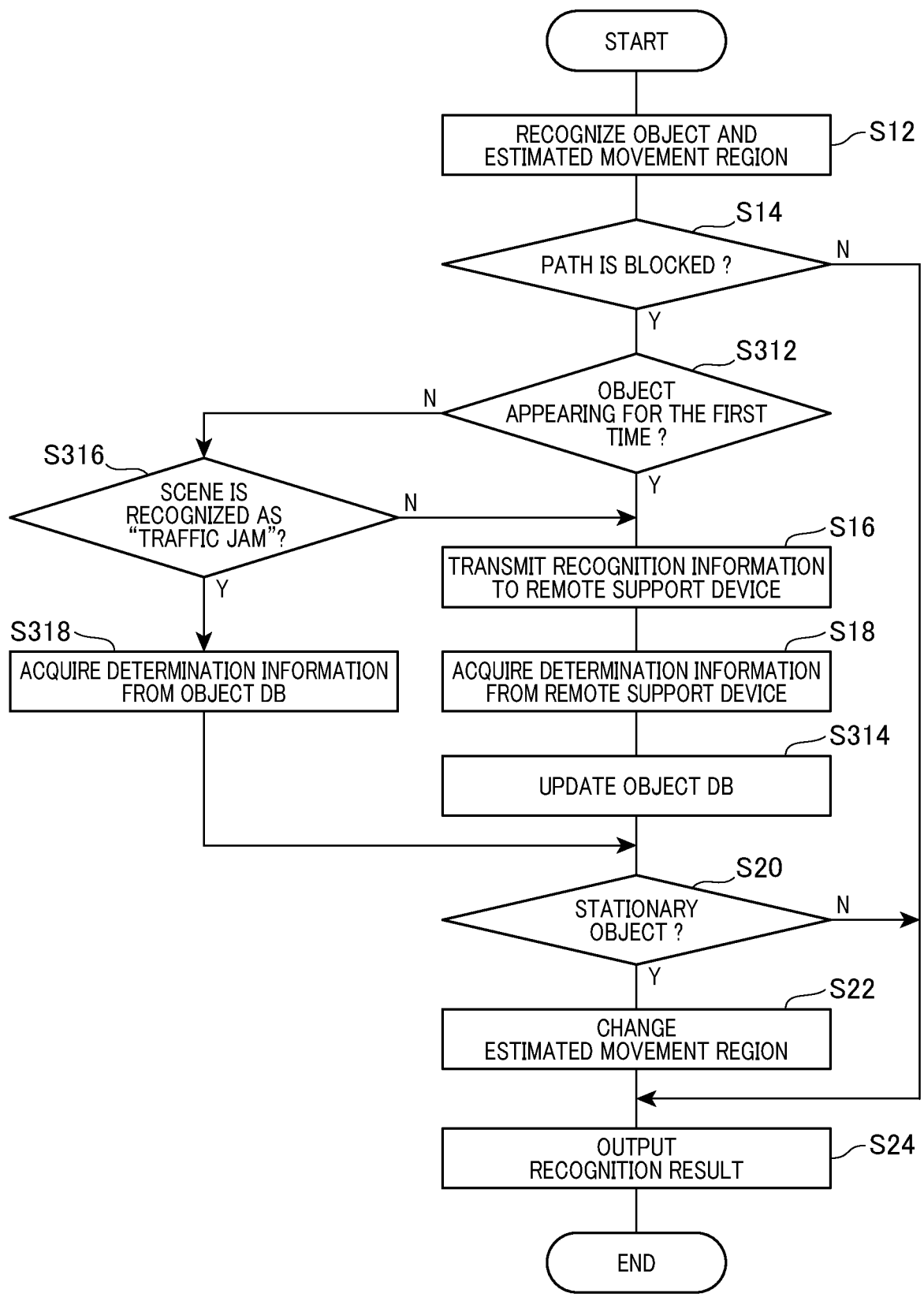
FIG. 10 is a flow chart showing an example of a recognition process of the third embodiment.

Next, an operation of the autonomous driving system 300 according to the third embodiment will be described. In the third embodiment, the recognition device 310 performs a recognition process shown in FIG. 10. In the recognition process of the third embodiment, the same steps as in the recognition process of the first embodiment (FIG. 5) are denoted by the same step numbers and will not be described in detail.

In the case where, in step S14, the path is determined to be blocked, the process proceeds to step S312. In step S312, the acquisition unit 346 determines whether the object ID of the object 74 included in the recognition information transferred from the determination unit 44 is already present in the object DB 50 to determine whether the object 74 appears for the first time. In the case where the object ID is not present in the object DB 50, the acquisition unit 346 determines that the object 74 appears for the first time, and the process proceeds to step S16. On the other hand, in the case where the object ID is present in the object DB 50, the acquisition unit 346 determines that the object 74 has already appeared, and the process proceeds to step S316.

In steps S16 and S18, the acquisition unit 346 acquires determination information from the remote support device 60 as in the first embodiment. Next, in step S314, the acquisition unit 346 updates the object DB 50, and the process proceeds to step S20.

On the other hand, in step S316, the recognition unit 342 recognizes a scene, based on the sensing data, and transfers the recognition result of recognizing the scene to the acquisition unit 346. Then, the acquisition unit 346 determines whether the recognition unit 342 has recognized that the scene is a "traffic jam". In the case where the scene is a "traffic jam", the process proceeds to step S318, and in the case where the scene is not a "traffic jam", the process proceeds to step S16.

In step S318, the acquisition unit 346 does not acquire determination information from the remote support device 60, and acquires the determination information stored in the object DB 50, and the process proceeds to step S20.

As described above, in the autonomous driving system according to the third embodiment, in the case where the same object is recognized in the scene of a traffic jam, the recognition device acquires the identification information not from the remote support device but from the object DB. This can prevent repeated contact with the operator 70.

The acquisition unit 346 may determine, according to the scene, whether to acquire determination information from the remote support device 60 by using the amount of movement of the vehicle 30 from a time point at which the previous determination information is acquired. For example, the acquisition unit 346 may be configured such that in the case where the same object 74 as the object 74 on which the determination information has been previously acquired from the remote support device 60 is recognized again by the recognition unit 42, and the amount of movement of the vehicle 30 from the time point at which the previous determination information is acquired is equal to or less than a predetermined value, the acquisition unit 346 does not acquire determination information on the same object 74 recognized again from the remote support device 60.

Specifically, the object DB 50 stores, for example, in addition to the example shown in FIG. 8, a "previous determination position" that indicates the position of the vehicle 30 when the previous determination information on each object 74 is acquired and that is associated with the object ID of the object 74. Each time recognition information is transferred from the determination unit 44 to the acquisition unit 346, the acquisition unit 346 determines whether an object ID included in the recognition information is already present in the object DB 50. In the case where the object ID is already present in the object DB 50, the acquisition unit 346 determines whether a difference between the previous determination position stored in association with the object ID and the current position of the vehicle 30 is equal to or less than a predetermined value to determine whether the amount of movement of the vehicle 30 from the previous determination is small.

In the case where the amount of movement of the vehicle 30 from the previous determination is small, the acquisition unit 346 determines that the current scene is the same as the scene for which the previous determination information is acquired, and the acquisition unit 346 does not acquire determination information from the remote support device 60, and acquires the determination information stored in the object DB 50. In the case where the amount of movement exceeds the predetermined value, the acquisition unit 346 acquires determination information, and updates the previous determination position and the previous determination information that are associated with the object ID of the object in the object DB 50.

The amount of movement of the vehicle 30 may not necessarily be obtained from the difference between the stored position of the vehicle 30 at which the previous determination information is acquired and the current position. The amount of movement of the vehicle 30 may be obtained based on a difference between a stored date and time when the previous determination information is acquired and the current date and time, and the speed of the vehicle 30 on the stored date and time and the current date and time.

Fourth Embodiment

Next, a fourth embodiment will be described. In an autonomous driving system according to the fourth embodiment, the same components as in the autonomous driving system 100 according to the first embodiment are denoted by the same reference numerals and will not be described in detail.

As shown in FIG. 1, an autonomous driving system 400 according to the fourth embodiment includes a recognition device 410 mounted on the vehicle 30, and the remote support device 60. A hardware configuration of the recognition device 410 is the same as the hardware configuration of the recognition device 10 according to the first embodiment shown in FIG. 2 and thus will not be described.

Next, a functional configuration of the recognition device 410 according to the fourth embodiment will be described with reference to FIG. 3. As shown in FIG. 3, the recognition device 410 includes a recognition unit 442, the determination unit 44, the acquisition unit 46, and a change unit 448. The functional units are implemented by the CPU 12 shown in FIG. 2.

The recognition unit 442 recognizes a pedestrian as the object 74, and further recognizes a type of the pedestrian. Examples of the type of a pedestrian include an elderly person, a child, and a traffic guide. The recognition unit 442 includes information on the type of the pedestrian into the recognition information to be transferred to the determination unit 44.

When the change unit 448 changes the estimated movement region 76 so that the radius of the estimated movement region 76 is reduced, the degree of reduction in the radius of the estimated movement region 76 is varied according to the type of the pedestrian. For example, as shown on the left side of FIG. 11, in the case where an object (pedestrian) 74A is an elderly person or a child, the object 74A may make an unexpected movement and for example, the object 74A is more likely to run out into the path; thus, the change unit 448 reduces the degree of reduction in the radius of the estimated movement region 76 so that the estimated movement region 78 after the change is not excessively small. For example, as shown on the right side of FIG. 11, in the case where an object (pedestrian) 74B is a traffic guide, the object 74B is less likely to move; thus, the change unit 448 increases the degree of reduction in the radius of the estimated movement region 76 so that the estimated movement region 78 after the change is considerably small.

Next, an operation of the autonomous driving system 400 according to the fourth embodiment will be described. In the fourth embodiment, the recognition device 410 performs a recognition process shown in FIG. 12. In the recognition process of the fourth embodiment, the same steps as in the recognition process of the first embodiment (FIG. 5) are denoted by the same step numbers and will not be described in detail.

In step S412, the recognition unit 442 recognizes the object 74, a type of the object 74, and the estimated movement region 76.

In the case where, through steps S14 to S20, it is determined that the recognized object 74 blocks the path and is a stationary object, in step S422, the change unit 448 changes the estimated movement region 76 based on the degree of reduction in the radius of the estimated movement region 76 varied according to the type of the pedestrian.

As described above, in the autonomous driving system according to the fourth embodiment, the recognition device causes the degree of reduction in the estimated movement region to be varied according to the type of a pedestrian as the object. This makes it possible to switch priorities between the facilitation of travel of the vehicle and the safety aspect according to the type of the pedestrian.

Fifth Embodiment

Next, a fifth embodiment will be described. In an autonomous driving system according to the fifth embodiment, the same components as in the autonomous driving system 100 according to the first embodiment are denoted by the same reference numerals and will not be described in detail.

As shown in FIG. 1, an autonomous driving system 500 according to the fifth embodiment includes a recognition device 510 mounted on the vehicle 30, and the remote support device 60. A hardware configuration of the recognition device 510 is the same as the hardware configuration of the recognition device 10 according to the first embodiment shown in FIG. 2 and thus will not be described.

Next, a functional configuration of the recognition device 510 according to the fifth embodiment will be described with reference to FIG. 3. As shown in FIG. 3, the recognition device 510 includes a recognition unit 542, the determination unit 44, the acquisition unit 46, and the change unit 48. The functional units are implemented by the CPU 12 shown in FIG. 2.

The recognition unit 542 recognizes, as the object 74, a pedestrian who is present at the position of a crosswalk. Specifically, the recognition unit 542 recognizes a pedestrian and a crosswalk that are present in the direction of travel of the vehicle 30. In the case where a pedestrian is present at the position of the crosswalk, the recognition unit 542 recognizes the pedestrian as the object 74, and also recognizes the estimated movement region 76.

Thus, in the case where, as shown on the upper side of FIG. 13, the object 74 is present at the position of a crosswalk and the path 72 is blocked, the acquisition unit 46 contacts the operator 70 and acquires determination information from the remote support device 60. On the other hand, in the case where, as shown on the lower side of FIG. 13, a pedestrian is present at a position that is not the position of a crosswalk, the pedestrian is not recognized as the object 74; thus, the path 72 is not blocked by the estimated movement region 76. This is based on the assumption that in a place that is not a crosswalk, a pedestrian is less likely to move toward the path 72 of the vehicle 30.

An operation of the autonomous driving system 500 according to the fifth embodiment is the same as the operation of the autonomous driving system 100 according to the first embodiment, except that in step S12 of the recognition process shown in FIG. 5, a pedestrian located at a crosswalk is recognized as the object 74, and thus will not be described.

As described above, in the autonomous driving system according to the fifth embodiment, the recognition device recognizes, as the object, a pedestrian located at a crosswalk. Thus, since the situation is limited to a crosswalk, unnecessary blockage of the path and unnecessary contact with the operator are prevented, allowing facilitation of travel of an autonomous vehicle.

The embodiments may be implemented in combination as appropriate.

The recognition process performed by the CPU reading the software (program) in the embodiments may be performed by various processors other than the CPU. Examples of such processors include a programmable logic device (PLD), such as a field-programmable gate array (FPGA), whose circuit configuration can be changed after manufacture, and a dedicated electric circuit, such as an application specific integrated circuit (ASIC), which is a processor having a circuit configuration specifically designed for performing a specific process. The recognition process may be performed by one of these various processors or by two or more processors of the same type or different types in combination (e.g., a plurality of FPGAs, a combination of a CPU and an FPGA, etc.). More specifically, the hardware structure of these various processors is an electric circuit obtained by combining circuit elements such as semiconductor elements.

In the embodiments, the recognition program is stored (installed) in advance in the storage unit, but the present disclosure is not limited to this. The program may be stored in a non-transitory tangible storage medium such as a CD-ROM, a DVD-ROM, a Blu-ray Disc, or a USB memory. The program may be downloaded from an external device via a network.

Although the present disclosure has been described in accordance with the embodiments, it is understood that the present disclosure is not limited to the embodiments and structures. The present disclosure includes various modifications and modifications within the equivalent range. In addition, various combinations and forms, as well as other combinations and forms including only one element, more, or less, are within the scope and spirit of the present disclosure.

What is claimed is:

1. A recognition device comprising:
a recognition unit configured to recognize a two-wheeled vehicle facing toward a direction perpendicular to a path of an own vehicle as an object present in a direction of travel of the own vehicle and an estimated movement region of the object;
a determination unit configured to determine whether a path of the own vehicle is blocked by the object by determining whether the estimated movement region of the object overlaps with the path of the own vehicle, based on a recognition result obtained by the recognition unit;
an acquisition unit configured to, in response to the determination unit determining that the path is blocked, acquire information indicating whether the object is a moving object or a stationary object from an operator; and
a change unit configured to change the estimated movement region recognized by the recognition unit so that a width of the estimated movement region in a straight-forward direction of the object is reduced and a width of the estimated movement region in a direction perpendicular to the straight-forward direction is increased, in response to the information acquired by the acquisition unit indicating that the object is a stationary object and in response to the recognition unit recognizing that the object is a two-wheeled vehicle facing toward the direction perpendicular to the path of the own vehicle, wherein a control device of the own vehicle controls autonomous driving of the own vehicle based on the estimated movement region as changed.

2. The recognition device according to claim 1, wherein
the recognition unit is further configured to recognize a pedestrian as an object present in the direction of travel of the own vehicle, and
the change unit is configured to, in response to the information acquired by the acquisition unit indicating that the object recognized as a pedestrian is a stationary object, change an estimated movement region corresponding to the object recognized as a pedestrian so that the estimated movement region corresponding to the object recognized as a pedestrian is reduced.

3. The recognition device according to claim 2, wherein
the recognition unit is configured to recognize a type of the pedestrian, and
when the change unit changes the estimated movement region so that the radius of the estimated movement region is reduced, a degree of reduction in the radius is varied according to the type of the pedestrian.

4. The recognition device according to claim 2, wherein
the recognition unit is configured to recognize that the pedestrian is located at a crosswalk.

5. The recognition device according to claim 1, wherein
the recognition unit is configured to recognize a scene indicating a situation around the own vehicle, and
the acquisition unit is configured to determine whether to acquire information from the operator, according to the scene recognized by the recognition unit.

6. The recognition device according to claim 5, wherein
the acquisition unit is configured to, in a case where the same object as an object on which the information has been acquired from the operator is recognized again by the recognition unit, and the scene recognized by the recognition unit indicates a traffic jam, not acquire information on the object recognized again from the operator.

7. A recognition method comprising:
recognizing, by a recognition unit, a two-wheeled vehicle facing toward a direction perpendicular to a path of an own vehicle as an object present in a direction of travel of the own vehicle and an estimated movement region of the object;
determining, by a determination unit, whether a path of the own vehicle is blocked by the object by determining whether the estimated movement region of the object overlaps with the path of the own vehicle, based on a recognition result obtained by the recognition unit;
in response to the determination unit determining that the path is blocked, acquiring, by an acquisition unit, information indicating whether the object is a moving object or a stationary object from an operator; and
changing, by a change unit, the estimated movement region recognized by the recognition unit so that a width of the estimated movement region in a straight-forward direction of the object is reduced and a width of the estimated movement region in a direction perpendicular to the straight-forward direction is increased, in response to the information acquired by the acquisition unit indicating that the object is a stationary object and in response to the recognition unit recognizing that the object is a two-wheeled vehicle facing toward the direction perpendicular to the path of the own vehicle, wherein autonomous driving of the own vehicle is controlled based on the estimated movement region as changed.

8. A non-transitory computer readable storage medium having instructions stored thereon that, when executed by a computer, cause the computer to function as:
a recognition unit configured to recognize a two-wheeled vehicle facing toward a direction perpendicular to a path of an own vehicle as an object present in a direction of travel of the own vehicle and an estimated movement region of the object,
a determination unit configured to determine whether a path of the own vehicle is blocked by the object by determining whether the estimated movement region of the object overlaps with the path of the own vehicle, based on a recognition result obtained by the recognition unit,
an acquisition unit configured to, in response to the determination unit determining that the path is blocked, acquire information indicating whether the object is a moving object or a stationary object from an operator, and
a change unit configured to change the estimated movement region recognized by the recognition unit so that a width of the estimated movement region in a straight-forward direction of the object is reduced and a width of the estimated movement region in a direction perpendicular to the straight-forward direction is increased, in response to the information acquired by the acquisition unit indicating that the object is a stationary object and in response to the recognition unit recognizing that the object is a two-wheeled vehicle facing toward the direction perpendicular to the path of the own vehicle, wherein a control device of the own vehicle controls autonomous driving of the own vehicle is controlled based on the estimated movement region as changed.

* * * * *